United States Patent [19]

Sachtler et al.

[11] Patent Number: 6,143,681

[45] Date of Patent: Nov. 7, 2000

[54] NO$_x$ REDUCTION CATALYST

[75] Inventors: Wolfgang M. H. Sachtler; Haiying Chen, both of Evanston, Ill.

[73] Assignee: Northwestern University, Evanston, Ill.

[21] Appl. No.: 09/112,997

[22] Filed: Jul. 10, 1998

[51] Int. Cl.⁷ .................................................. B01J 21/00
[52] U.S. Cl. ................................ 502/74; 502/60; 502/64; 502/66
[58] Field of Search .................................. 502/60, 64, 66, 502/74, 78, 79

[56] References Cited

U.S. PATENT DOCUMENTS

| | | | |
|---|---|---|---|
| 5,254,322 | 10/1993 | Bhore et al. | 423/239.2 |
| 5,260,043 | 11/1993 | Li et al. | 423/239.2 |
| 5,354,720 | 10/1994 | Leyrer et al. | 502/64 |
| 5,374,410 | 12/1994 | Graselli et al. | 423/239.2 |
| 5,451,387 | 9/1995 | Farnos et al. | 423/239.2 |
| 5,482,692 | 1/1996 | Audeh et al. | 423/239.2 |
| 5,520,895 | 5/1996 | Sharma et al. | 423/239.2 |
| 5,529,964 | 6/1996 | Weitkamp et al. | 502/74 |
| 5,543,125 | 8/1996 | Uchida et al. | 423/239.2 |
| 5,552,129 | 9/1996 | Farnos et al. | 423/239.2 |

OTHER PUBLICATIONS

Lunin et al., *Iron–Bearing Catalysts in Selective Methane Reduction of NO*, Doklady Physical Chemistry, vol. 349, Nos. 4–6, pp. 193–195, Apr. 1, 1996.

Feng et al., *FeZSM–5: A Durable SCR Catalyst for NO$_x$ Removal from Combustion Streams*, Journal of Catalysts 166, 368–376 (Article No. CA971530), 1997.

Fend et al. ("A durable SCR catalyst for NOx Removal from Combustion Streams"), Journal of Catalysis 166, pp. 368–376, 1997.

*Primary Examiner*—Tom Dunn
*Attorney, Agent, or Firm*—Welsh & Katz, Ltd.

[57] ABSTRACT

A volatile metal halide is sublimed over a zeolite, which is then exposed to water, dried and calcined. A promoter may then be incorporated into the zeolite structure by adding the zeolite to a solution of a rare earth salt resulting in a metal exchanged zeolite such as La-Fe/ZSM-5. Contacting exhaust gas with NO$_x$ over the catalyst results in reduction of the NO$_x$ to N$_2$. The spent catalyst may be regenerated by heating in an oxygen atmosphere.

23 Claims, 6 Drawing Sheets

$NO_x$ REDUCTION CATALYST

FIELD OF THE INVENTION

This invention relates to a method for reduction of nitrogen oxides contained in a gaseous stream such as a lean burn internal combustion engine exhaust. The method employs a durable and stable catalyst comprising a metal/zeolite catalyst which is prepared by the sublimation of a volatile metal compound over the zeolite.

BACKGROUND OF THE INVENTION

Atmospheric pollution is a societal problem which is receiving much attention. The major source of such pollution is the extensive use of fossil fuels, although industrial and chemical processes, such as the manufacture of nitric acid, also contribute. The principal pollutants are nitrogen oxides, carbon monoxide and, perhaps to a lesser extent, hydrocarbons, sulfur oxides and other objectionable gases and vapors.

Although several nitrogen oxides are known which are relatively stable at ambient conditions, it is generally recognized that two of these, nitric oxide (NO) and nitrogen dioxide ($NO_2$), are the principal contributors to smog and other undesirable environmental effects when they are discharged into the atmosphere.

Formation of man-made nitrogen oxides from the elements occurs in the high temperature zones of combustion processes. The internal combustion engine and coal-, oil- and gas-fired furnaces, boilers and incinerators all contribute to $NO_x$ emissions. Although the concentrations of $NO_x$ in the exhaust gases produced by combustion usually are low, the aggregate amounts discharged in industrial and/or highly populated areas is adequate to cause problems. For purposes of the present invention, the nomenclature $NO_x$ will be used herein to represent nitric oxide, nitrogen dioxide, other nitrogen oxides and mixtures thereof.

The reduction of obnoxious nitrogen oxides to environmentally benign nitrogen in the emissions from lean burn engines cannot be achieved with the type of catalysts that are now used in most passenger cars in the United States, because such catalysts do not function under oxidizing conditions; whereas, lean burn emissions always contain substantial amounts of free oxygen. It is widely assumed that cars of the future should use lean burn engines because of their superior fuel economy. For treating the emissions from such engines, a different class of catalysts has been considered; they contain copper or other metal ions in zeolite cavities. They are active under oxidizing conditions; however, their activity is drastically suppressed by water vapor which is, of course, an inevitable ingredient of all internal combustion engine emission gases. Recently, a type of catalyst has been prepared by a narrowly specified ion exchange procedure in an aqueous slurry of iron oxalate and the zeolite ZSM-5. These catalysts are claimed to operate in gases that contain both free oxygen and a substantial content of water vapor. However, they appear to require a higher operating temperature than is desirable or necessary for treating emissions from lean burn or diesel engines.

SUMMARY OF THE INVENTION

An object of the subject invention is a method of purifying $NO_x$ containing exhaust gases and a zeolite compound for use in such a method.

A further object of the subject invention is a method of preparing a catalyst for purifying $NO_x$ from exhaust gases including the sublimation of a volatile metal halide onto a zeolite.

A further object of the subject invention is a highly active and stable catalyst having a promoter incorporated therein.

These and other objects are attained by the process of the subject invention, wherein a volatile metal halide is sublimed over a zeolite, which is then exposed to water, dried and calcined. A promoter is then incorporated into the zeolite structure by adding the zeolite to a solution of a rare earth salt, filtering and drying. Contacting exhaust gas with $NO_x$ over the catalyst results in reduction of the $NO_x$ to $N_2$. The catalyst may be regenerated by heating in an oxygen atmosphere.

DETAILED DESCRIPTION OF THE INVENTION

The present invention relates to a process for catalytically removing $NO_x$ from oxygen-rich combustion products. The process utilizes a novel catalyst, namely, metal-exchanged crystalline zeolites, to yield a process which is capable of removing $NO_x$ from oxygen-containing combustion products.

The catalyst of the present invention contains metals such as iron, as ions or oxo-ions inside the cavities of a zeolite such as ZSM-5. The preparation condition is, however, totally different from that previously taught: a gas flow containing the vapor of a volatile metal halide such as $FeCl_3$ is carried over the zeolite; the volatile iron compound reacts chemically with the acid sites inside the zeolite preferably in a sublimation process, which is subsequently exposed to water. In the case of $FeCl_3$ and zeolite in its H-form, the overall chemistry is given by the equation:

where the positive charges of $H^+$ or $(FeO)^+$ are compensated by negative charges of the zeolite framework. As the sum total of positive charges has to be equal to the sum total of negative changes, the latter number being given for the zeolite matrix by the number of aluminum centered tetrahedra, the subject invention, in one embodiment, will have an iron loading optimally characterized by the ratio Fe/Al=1/1, though good results are observed at ratios of 0.8/1, where Al stands for the number of aluminum centered tetrahedra. This iron loading is markedly higher than that achieved by conventional ion exchange which is limited by Fe/Al=½ for $Fe^{2+}$ ions and Fe/Al=⅓ for $Fe^{3+}$ ions. A high Fe loading, as achieved by the subject invention, is considered essential for the superior performance of the materials described here. This is not limited to the element iron, but with other elements, $M_1$ the same loading M/Al=1 is achieved by the described sublimation technique. Slight modifications of it have resulted in ratios even exceeding unity. High iron loadings can, of course, also be achieved by simple impregnation, but that procedure results in catalysts of inferior performance for $NO_x$ reduction. Rare earth ions, preferably lanthanum or cerium, may also be added to the zeolite by conventional techniques such as ion exchange.

These catalysts have been tested for the reduction of nitrogen oxides with i-butane under conditions simulating vehicular emission: Gas Hourly Space Velocity (GHSV) 42,000 $h^{-1}$, NO:0.2%, i-$C_4H_{10}$:0.2%; $O_2$:3%, $H_2O$:10%, make up:He. By varying the temperature it was found that a maximum conversion of nitrogen oxides to nitrogen near 90% occurred at a temperature near 350° C. It was also found that in the presence of water vapor, the activity of the catalyst at low temperature is even higher. The effectiveness factor, expressed by a ratio of the number of NO molecules and isobutane molecules consumed, was above 1.5 at low temperature, but near unity at the temperature of maximum NO conversion.

In general, since the reaction is exothermic, but low concentrations of $NO_x$ are present, adequate temperature control is readily achieved with a simple stationary fixed-bed of catalyst. However, other contacting means are contemplated, such as contacting with a fixed fluid bed, a transport bed and a monolithic catalyst structure such as a honeycomb.

A catalyst useful in this invention will now be described in detail. It comprises an intermediate pore size zeolite (e.g., preferably less than about 7 Angstroms pore size, but may be from about 4 to about 15 Angstroms) having a silica to alumina ratio of at least about 10 to at least about 100 and a Constraint Index of about 0.4 to about 12, with the zeolite having been contacted by an iron compound or iron complex in the vapor phase to incorporate iron into the pores of the crystal. The Constraint Index qualifies it as having an intermediate port size. Examples of such zeolites include ZSM-5; ZSM-11; ZSM-21; ZSM-23; ZSM-35; ZSM-38; ZSM48; ZSM-57 and ZSM-58. These zeolites are known in the art and are sometimes referred to as being of the ZSM-5 type; this term is used herein to designate zeolites useful in this invention. Other zeolites, such as mordenite, ferrierite, beta and faujasite can also be used.

The zeolites of the present invention are preferably used in the acid form, i.e., the hydrogen form or other univalent or multivalent cationic form to the extent that such zeolites are capable of being exchanged with the metals discussed herein. Other zeolite forms useful in the subject invention include Na, $NH_4$, Ca, Ce and Mg. Suitable crystalline zeolites include those materials which are stable under the described reaction conditions and which have a pore size sufficient to effect the subject reaction. While catalysts having a Si/Al ratio less than 5.0 prior to treatment appear to demonstrate only limited activity, such catalysts may be activated by subjecting the catalyst to dealumination according to methods well known in the art.

Lanthanum and other rare earth elements, such as La, Ce, Gd, Nd, Sm, Ho, Yb, Lu; in addition to Th and U, may be incorporated into the zeolite by known ion-exchange methods. With the unpromoted and the promoted catalyst, durability tests of 100 h showed a decrease in activity by a few percent. In the case of the promoted catalyst, it was possible to regenerate it by simply blowing an oxygen containing gas over it at 500° C.; the original activity was completely restored.

Thus, the zeolite catalyst of the subject invention may have the composition of $$(M^1_x M^2_y Na_a)O_b(Al_2O_3)_c(SiO_2)_d$$

where $M^1$ is Fe, Ga, In, Sn or Pd and $0.1 \leq x/c \leq 5$; $M^2$ is a rare earth element and $0 \leq y/x \leq 1.5$; $0 \leq a/c \leq 2$; $10 \leq d/c \leq 100$; $b=(V_{M^1}* x+V_{M^2}* y+a)/2$, where $V_{M}^1$ and $V_{M}^2$ are the charge valence of $M^1$ and $M^2$, respectively. Within this composition, it is preferable to maintain the y/x ratio between 0.02 and 0.2. Further, the x/c ratio is preferably maintained between 0.5 and 4.0. In the above formulation it is desirable to have a ratio of $M^1+M^2$/Al of at least 0.8 and preferably 1.0 or even slightly higher.

(I) Preparation of Catalysts

Fe/ZSM-5 catalysts were prepared by chemical vapor deposition, i.e., by subliming $FeCl_3$ into the cavities of ZSM-5. Other volatile halides such as $GaCl_3$, $InCl_3$, $SnCl_4$, $PdCl_2$, $FeBr_3$ and $FeCl_2$ may also be used. Thus, a zeolite such as ZSM-5, mordenite, ferrierite, beta or faujasite is exposed to a flowing or stationary inert gas such as $N_2$, Ar or He, which gas carries the vapor of such a metal halide. Alternatively, the metal halide may be introduced to the zeolite under vacuum. The zeolite is heated to between 150° C. and 600° C., preferably 280°–360° C. during deposition; washing in water or exposure to water vapor follows and then calcination at an elevated temperature in air or an inert gas. The subliming can also be carried out under vacuum in the absence of carrier gas.

In general, vapor deposition is accomplished by loading the zeolite into one side of a U-shaped reactor and the volatile metal halide into the other side. The materials are maintained separate by a porous frit. An inert gas flow at about 280°–360° C. carries the metal vapor to the heated zeolite site where the proton is exchanged for, in the case of $FeCl_3$, the Fe ion. The metal exchanged zeolite is washed with water, dried, then calcined at 200° C.–800° C., preferably 600° C. under $O_2$, $N_2$, Ar or He for 1–4 hours, preferably 2 hours. Simple mixing of the solid constituents and heating may also be conducted to exchange the metals.

Preparation of catalysts of even higher activity, selectivity or stability for the selective reduction of nitrogen oxides in lean burn engine emissions, may be prepared by adding a catalyst promoter to the product obtained above. Typical promoters are ions or oxo-ions or oxides of elements in the group traditionally called rare earths: elements such as La, Ce, Nd, Sm, Gd, Ho, Yb and Lu; or actinide elements such as Th and U. For this purpose the calcined product from above or its non-calcined precursor, is introduced in an aqueous solution of a suitable salt of the promoter ion. The slurry obtained in this way is stirred for several hours at ordinary or elevated temperature, followed by filtering, washing with water and drying. Examples of promoter precursors are the nitrates, oxalates or acetates of lanthanum or cerium.

EXAMPLE 1

Fe/ZSM-5 catalysts were prepared by chemical vapor deposition, i.e., by subliming $FeCl_3$ into the cavities of H/ZSM-5. This acid zeolite was prepared from Na/ZSM-5 obtained from UOP (lot#13923-60, Si/Al=14, Na/Al=0.67). 10 g of the parent zeolite was added to 2L 0.03M $NH_4$-$NO_3$ solution. The slurry was stirred at room temperature for 48 h, vacuum filtered, washed with 1 L doubly deionized water and air dried. This process was repeated three times to ensure complete exchange. The sample was then crushed to >60 mesh. To create a H/ZSM-5 sample, the obtained NH$_4$/ZSM-5 sample was calcined and held at 500° C. for 4 h in order to decompose the NH4 cation into protons.

5.0 g of the calcined H/ZSM-5 was loaded into one side of a U-shaped reactor. 1.0 g FeCl$_3$ was loaded into another side of the same reactor. The zeolite and FeCl$_3$ were separated by a porous frit. Chemical vapor deposition was done under Ar flow (100 mL/min) while the temperature of the reactor was kept at 320° C. The gas flow carried the vapor of FeCl$_3$ into the cavities of zeolites. FeCl$_3$ reacts chemically with the acid sites inside the zeolites according to the equation:

$$FeCl_3 + H^+ \rightarrow FeCl_2^+ + HCl$$

100 mL 1 M NaOH solution was used to absorb HCl from the outlet gas. After a certain time all the acid sites are consumed and the zeolite bed became uniformly yellow in color. The ratio of iron introduced to aluminum in the zeolite and to chlorine absorbed by NaOH solution is: Fe/Al/Cl=1/1/1. The remaining chlorine was washed out with doubly deionized H$_2$O. After drying in air, the sample (Fe/ZSM-5) was calcined in a flow of O$_2$ at 600° C. for 2 h.

EXAMPLE 2

To prepare a La-promoted Fe/ZSM-5 catalyst, 2.0 g calcined Fe/ZSM-5 from Example 1 was added to 200 mL 0.05 M La(NO$_3$)$_3$ solution. The slurry was stirred at room temperature overnight, vacuum filtered, washed with 200 mL doubly deionized water and air dried.

EXAMPLES 3–9

Following the procedure of Example 1, various zeolites were prepared with the sublimation method. The results are shown in Table 1.

TABLE 1

| Example | Si/Al Ratio | Unit Cell Composition | Fe/Al Ratio |
|---|---|---|---|
| 3 | 10 | (Fe$_2$O$_3$)$_{4.36}$(Al$_2$O$_3$)$_{4.36}$(SiO$_2$)$_{87.27}$ | 1 |
| 4 | 14.2 | (Fe$_2$O$_3$)$_{3.16}$(Al$_2$O$_3$)$_{3.16}$(SiO$_2$)$_{89.68}$ | 1 |
| 5 | 23.6 | (Fe$_2$O$_3$)$_{1.95}$(Al$_2$O$_3$)$_{1.95}$(SiO$_2$)$_{92.10}$ | 1 |
| 6 | 27.5 | (Fe$_2$O$_3$)$_{1.68}$(Al$_2$O$_3$)$_{1.68}$(SiO$_2$)$_{92.63}$ | 1 |
| 7 | 37.6 | (Fe$_2$O$_3$)$_{1.24}$(Al$_2$O$_3$)$_{1.24}$(SiO$_2$)$_{93.51}$ | 1 |
| 8 | 50 | (Fe$_2$O$_3$)$_{0.94}$(Al$_2$O$_3$)$_{0.94}$(SiO$_2$)$_{94.11}$ | 1 |
| 9 | 14.2 | (Fe$_2$O$_3$)$_{5.37}$(Al$_2$O$_3$)$_{3.16}$(SiO$_2$)$_{89.68}$ | 1.7 |

EXAMPLES 10–16

Following the procedure of Example 2, La is incorporated into the zeolites prepared in Examples 3–9. The results are shown in Table 2.

TABLE 2

| Example | Si/Al Ratio | Unit Cell Composition | Fe/Al Ratio |
|---|---|---|---|
| 10 | 10 | (La$_2$O$_3$)$_{0.06}$(Fe$_2$O$_3$)$_{4.30}$(Al$_2$O$_3$)$_{4.36}$(SiO$_2$)$_{87.27}$ | 1 |
| 11 | 14.2 | (La$_2$O$_3$)$_{0.06}$(Fe$_2$O$_3$)$_{3.10}$(Al$_2$O$_3$)$_{3.16}$(SiO$_2$)$_{89.68}$ | 1 |
| 12 | 23.6 | (La$_2$O$_3$)$_{0.05}$(Fe$_2$O$_3$)$_{1.90}$(Al$_2$O$_3$)$_{1.95}$(SiO$_2$)$_{92.10}$ | 1 |
| 13 | 27.5 | (La$_2$O$_3$)$_{0.04}$(Fe$_2$O$_3$)$_{1.64}$(Al$_2$O$_3$)$_{1.68}$(SiO$_2$)$_{92.63}$ | 1 |
| 14 | 37.6 | (La$_2$O$_3$)$_{0.04}$(Fe$_2$O$_3$)$_{1.20}$(Al$_2$O$_3$)$_{1.24}$(SiO$_2$)$_{93.51}$ | 1 |
| 15 | 50 | (La$_2$O$_3$)$_{0.04}$(Fe$_2$O$_3$)$_{0.90}$(Al$_2$O$_3$)$_{0.94}$(SiO$_2$)$_{94.11}$ | 1 |
| 16 | 14.2 | (La$_2$O$_3$)$_{0.2}$(Fe$_2$O$_3$)$_{5.17}$(Al$_2$O$_3$)$_{3.16}$(SiO$_2$)$_{89.68}$ | 1.7 |

Selective catalytic reduction of NO with i-C$_4$H$_{10}$ was tested in the continuous flow mode. A quartz reactor with a porous frit was charged with 0.200 g of catalyst. The sample was calcined in situ in a flow of O$_2$/He (10%) at 600° C. for 4 h. A stainless steel manifold allowed the addition of several different gases which could be mixed prior to contact with the catalyst. Gas flow rates were regulated by mass flow controllers so that the total flow rate was 280 mL/min, based on a bulk density of 0.5 g/mL for these zeolite samples, the calculated gas hourly space velocity (GHSV) was 42,000 h$^{-1}$. Typical inlet composition was NO 0.2%; i-C$_4$H$_{10}$ 0.2%; O$_2$ 3%; H$_2$O 10% (when added); He was used as a diluent. The catalyst was preconditioned at each temperature for 30 min. before the products analysis was commenced. The products were analyzed by a HP 5890GC with Alltech 13X molecular sieve and Porpark Q columns. NO conversion was determined from N$_2$ formation. i-C$_4$H$_{10}$ conversion was determined from CO$_2$ and CO formation. The effectiveness factor is defined as the ratio of the number of NO molecules and i-C$_4$H$_{10}$ molecules consumed.

Figure 1:
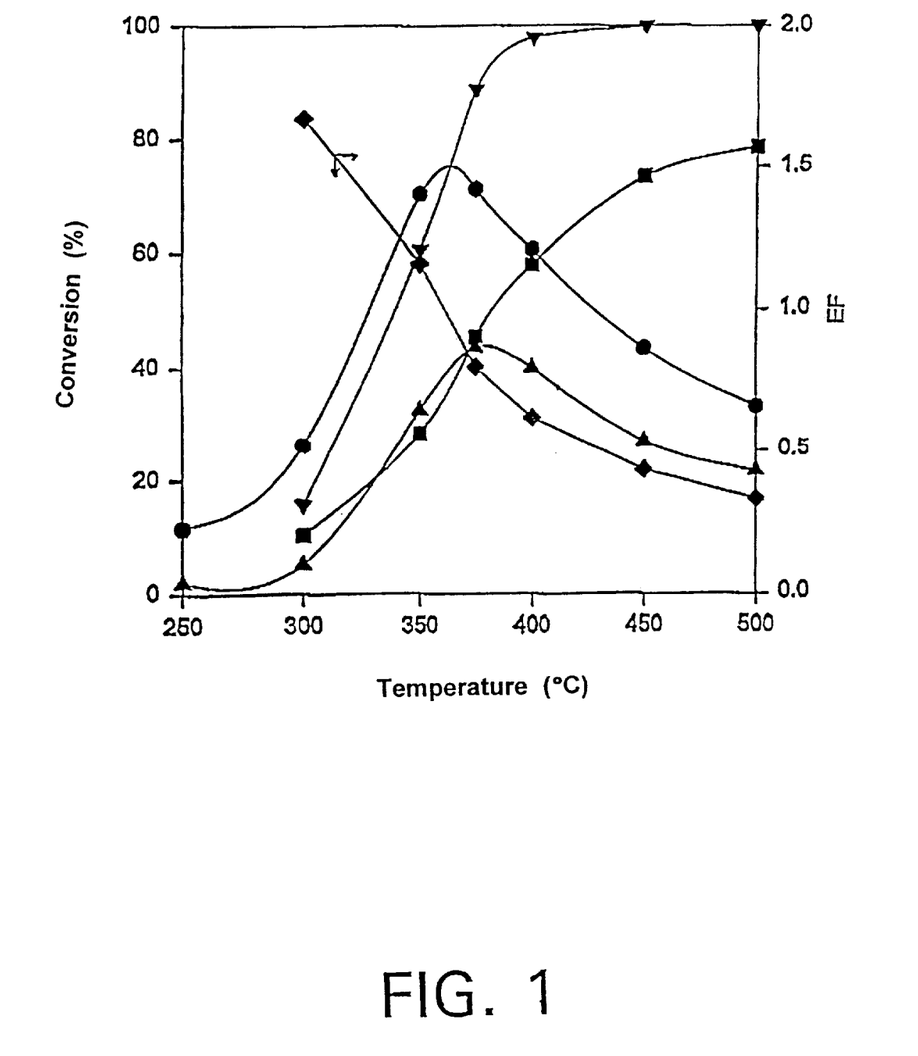
FIG. 1 is a graph showing the effect of reaction temperature on the selective catalytic reduction of $NO_x$ over Fe/ZSM-5 in the absence of $H_2O$.

The activity for the selective catalytic reduction of NO with i-C$_4$H$_{10}$ over Fe/ZSM-5 in the absence of H$_2$O is shown in FIG. 1. The conversion of NO to N$_2$ increased with increasing temperature. It reached its maximum of about 70% at a temperature of 350–375° C. Upon increasing the temperature further, the conversion of NO to N$_2$ decreased because the hydrocarbon was used up.

Figure 2:
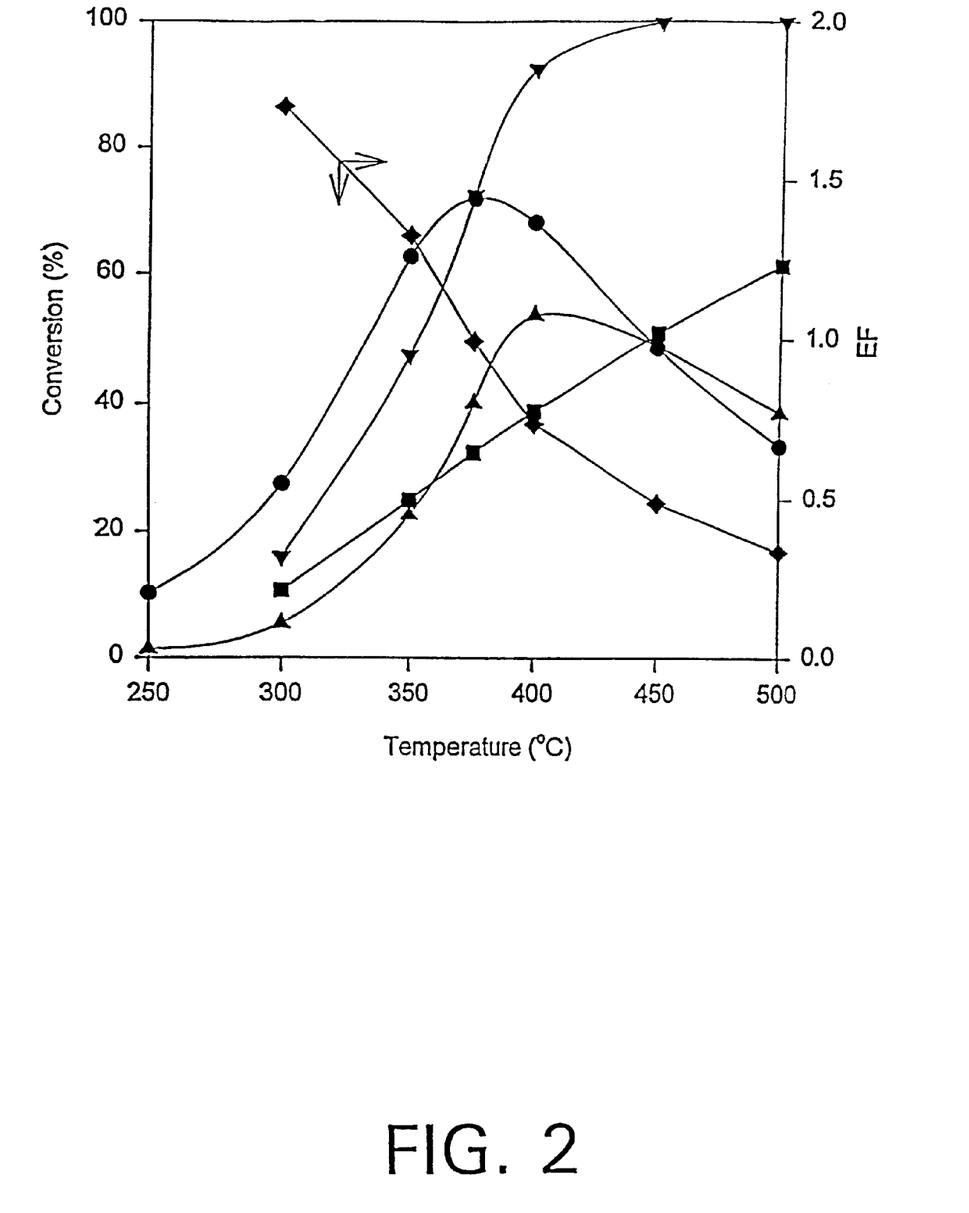
FIG. 2 is a graph showing the effect of reaction temperature on the selective catalytic reduction of $NO_x$ over Fe/ZSM-5 in the presence of $H_2O$.

When 10% H$_2$O was added to the feed stream, the catalytic activity of Fe/ZSM-5, as shown in FIG. 2, is similar to that observed with dry feed gas. The temperature corresponding to maximum NO to N$_2$ conversion (about 70%) shifted to 375° C. However, the presence of H$_2$O suppressed the undesired reaction, the selectivity for the desired reaction is consequently improved.

Figure 3:
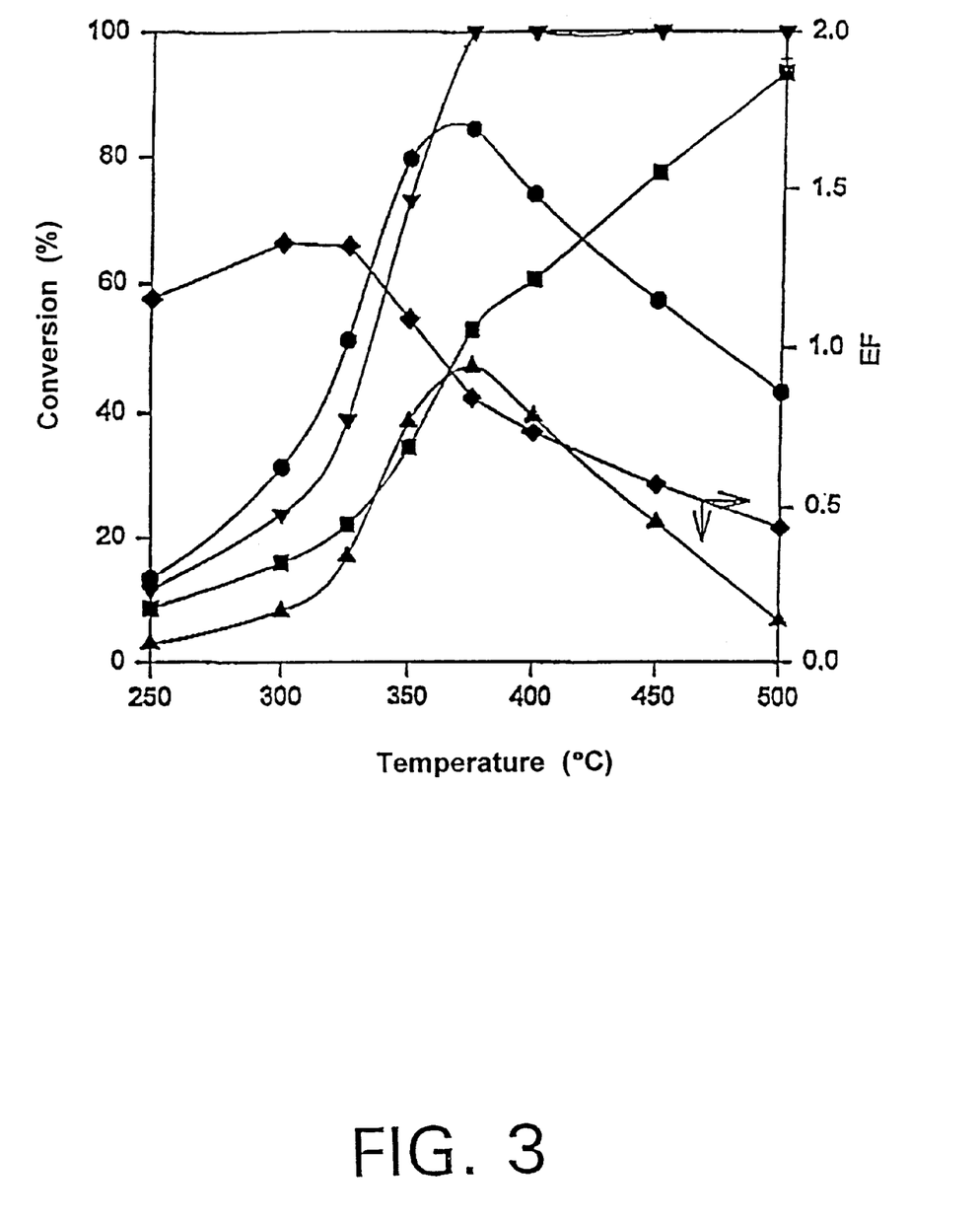
FIG. 3 is a graph showing the effect of reaction temperature on the selective catalytic reduction of $NO_x$ over La-doped Fe/ZSM-5 in the absence of $H_2O$.

FIG. 3 shows the activity of La-doped Fe/ZSM-5. It can be seen that the addition of La promotes the activity. In the absence of H$_2$O, the maximum conversion of NO to N$_2$ increased to 84% at 375° C.

Figure 4:
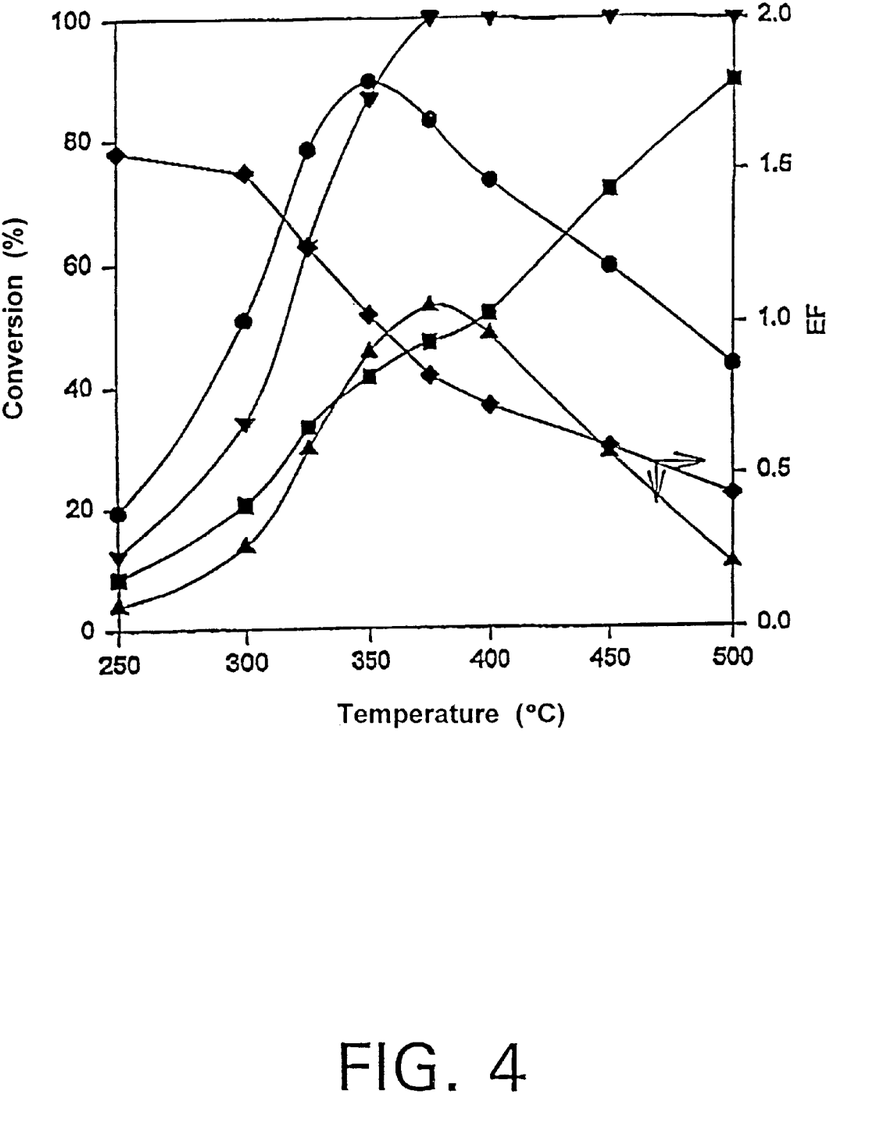
FIG. 4 is a graph showing the effect of reaction temperature on the selective catalytic reduction of $NO_x$ over La-doped Fe/ZSM-5 in the presence of $H_2O$.

When 10% H$_2$O was added to the feed stream the catalytic activity of the La-doped Fe/ZSM-5 at low temperature is even higher than with the dry feed, as shown in FIG. 4. About 90% conversion of NO to N$_2$ was reached at 350° C.

Figure 5:
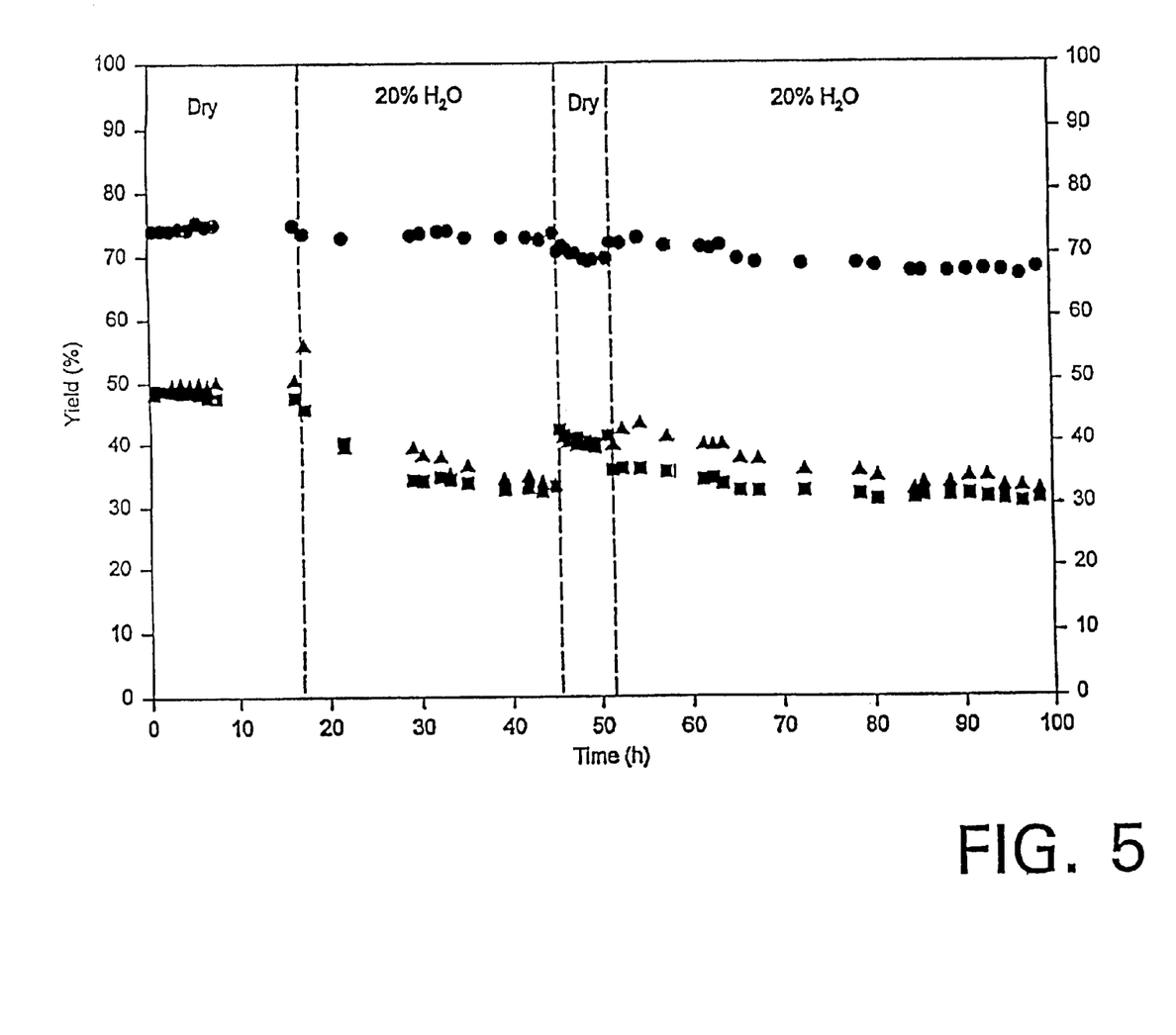
FIG. 5 is a graph showing the reduction of $NO_x$ with i-$C_4H_{10}$ over an Fe-zeolite.
Figure 6:
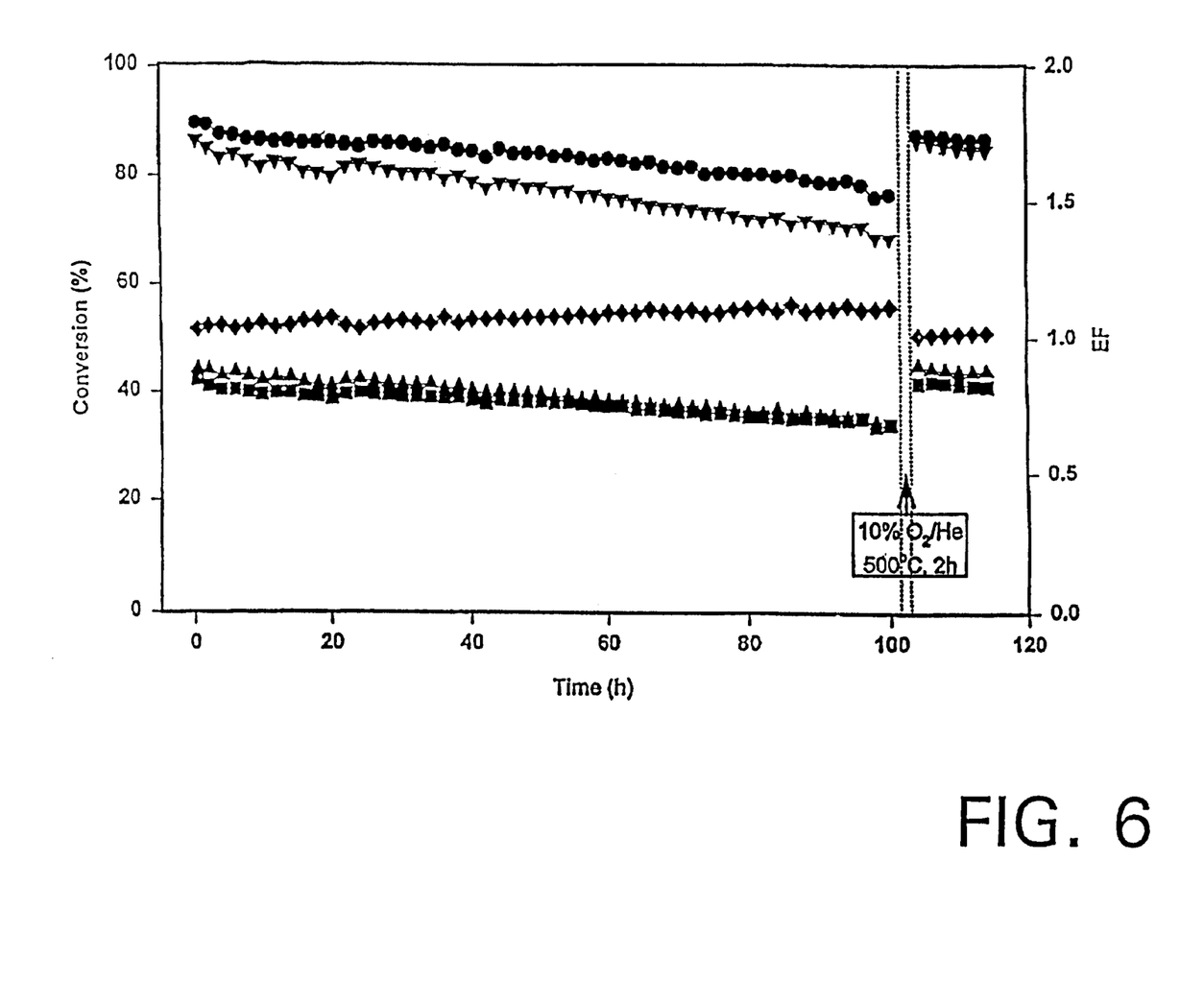
FIG. 6 is a graph showing the stability and in situ regeneratability of La-doped iron zeolite of the subject invention.

FIGS. 5 and 6 show the result of durability tests over Fe/ZSM-5 and La-doped Fe/ZSM-5, respectively. After a 100 h run, the activity decreased about 10% with both catalysts. However, when the spent La-doped Fe/ZSM-5 was treated in an O$_2$/He (10%) flow at 500° C., its original activity was completely restored. Apparently, the slight deactivation was caused by some carbonaceous deposit which can easily be burnt off.

Regeneration of the catalyst of the subject invention to its original activity is possible by heating in the presence of oxygen at atmospheric or elevated pressure and at 200° C. to 800° C., preferably 500° C. to 600° C.

EXAMPLE 17

The procedure of Example 1 is utilized with the zeolite Na/ZSM-5 without further processing. FeCl$_3$ is flowed over the zeolite and then contacted with water as in Example 1. Passing NO over the prepared catalytic zeolite results in results similar to FIGS. 1 and 2.

EXAMPLE 18

The procedure of Example 1 is utilized with the NH$_4$/ZSM-5 prepared as in Example 1 without further processing. FeCl$_3$ is flowed over the zeolite and contacted with water as in Example 1. Passing NO over the prepared catalytic zeolite results in results similar to FIGS. 1 and 2.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. A process for the preparation of a catalyst for the removal of $NO_x$ gases from a gas stream, comprising the steps of:
   flowing a metal halide in gas form across a zeolite compound whereby the metal halide reacts with the zeolite;
   exposing the reacted zeolite to water; and
   heating the water exposed, reacted zeolite, thereby resulting in a catalyst for the removal of $NO_x$ gases.

2. The process of claim 1 wherein the metal halide may be selected from the group consisting of $FeCl_3$ $GaCl_3$, $InCl_3$, $SnCl_4$, $PdCl_2$, $FeBr_3$, and $FeCl_2$.

3. The process of claim 1 wherein the zeolite is selected from the group consisting of mordenite, ferrierite, beta and faujasite.

4. The process of claim 1 wherein the metal halide is borne by a carrier gas selected form the group consisting of $N_2$, Ar, and He.

5. The process of claim 1 wherein the metal halide is flowed across the zeolite compound under vacuum.

6. The process of claim 1 wherein the step of heating the water exposed, reacted zeolite includes heating at 200° C. to 800° C. under a atmosphere selected from the group consisting of $O_2$, $N_2$, Ar, and He.

7. The process of claim 1 wherein the step of heating the water exposed, reacted zeolite includes heating at 600° C. in a flow of $O_2$ for about 2 hours.

8. The process of claim 1 further including the step of incorporating an ion selected from the group of La, Ce, Gd, Nd, Sm, Ho, Yb, Th, and U into the zeolite structure.

9. A zeolite catalyst of the structure where
   $M^1$ is Fe, Ga, In, Sn or Pd;
   $0.1 \leq x/c \leq 5$;
   $M^2$ is La, Ce, Gd, Nd, Sm, Ho, Yb, La, Th, U, or not present;
   $M^1+M^2/Al$ is at least about 0.8;
   $0 \leq y/x \leq 1.5$;
   $0 \leq a/c \leq 2$;
   $10 \leq d/c \leq 100$;
   $b=(V_M^1 x + V_M^2 y + a)/2$
($V_M^1$ and $V_M^2$ are valences of $M^1$ and $M^2$, respectively).

10. The zeolite catalyst of claim 9 wherein $0.02 \leq y/x \leq 0.2$.

11. The zeolite catalyst of claim 9 wherein $0.5 \leq x/c \leq 4.0$.

12. The zeolite catalyst of claim 9 where the ratio of $M^1+M^2/Al$ is about 1.0.

13. The zeolite catalyst of claim 9 wherein $M^1/Al$ is from about 0.8 to about 1.0.

14. A process for the preparation of a zeolite catalyst for the catalytic removal of $NO_x$ from a gas stream, comprising the steps of:
   a) subliming a metal halide across a zeolite compound, thereby forming a reacted zeolite;
   b) exposing the reacted zeolite to water;
   c) calcining the water exposed and reacted zeolite.

15. The process of claim 14 wherein the metal halide may be selected from the group consisting of $FeCl_3$ $GaCl_3$, $InCl_3$, $SnCl_4$, $PdCl_2$, $FeBr_3$, and $FeCl_2$.

16. The process of claim 14 wherein zeolite is selected form the group consisting of mordenite, ferrierite, beta and faujasite.

17. The process of claim 14 wherein the metal halide is borne by a carrier gas selected form the group consisting of $N_2$, Ar, and He.

18. The process of claim 14 wherein the metal halide is flowed across the zeolite compound under vacuum.

19. The process of claim 14 wherein the step of heating the water exposed, reacted zeolite includes heating at 200° C. to 800° C. under a atmosphere selected from the group consisting of $O_2$, $N_2$, Ar, and He.

20. The process of claim 14 wherein the step of heating the water exposed, reacted zeolite includes heating at 600° C. in flow of $O_2$ for about 2 hours.

21. The process of claim 14 further including the step of incorporating an ion selected from the group of La, Ce, Gd, Nd, Sm, Ho, Yb, Th, and U into the zeolite structure.

22. A process for the preparation of a catalyst for the removal of $NO_x$ gases from a gas stream, comprising the steps of:
   flowing a metal halide in gas form across a zeolite compound whereby the metal halide reacts with the zeolite;
   exposing the reacted zeolite to water; and
   heating the water exposed, reacted zeolite, thereby resulting in a catalyst for the removal of $NO_x$ gases;
   a zeolite catalyst of the structure where
   $M^1$ is Fe, Ga, In, Sn or Pd;
   $0.1 \leq x/c \leq 5$;
   $M^2$ is La, Ce, Gd, Nd, Sm, Ho, Yb, La, Th, U, or not present;
   $0 \leq y/x \leq 1.5$;
   $0 \leq a/c \leq 2$;
   $10 \leq d/c \leq 100$;
   $b=(V_M^1 X + V_M^2 y + a)/2$
($V_M^1$ and $V_M^2$ are valences of $M^1$ and $M^2$, respectively).

23. A zeolite catalyst of the structure where
   M is Fe, Ga, In, Sn or Pd;
   $0.8 \leq M/Al \leq 1.0$;
   $M/Al \geq 0.8$;
   $0 \leq a/c \leq 2$;
   $b=(V_M^1 x + V_M^2 y + a)/2$
      ($V_M^1$ and $V_M^2$ are valences of $M^1$ and $M^2$, respectively)
      and
   $10 \leq d/c \leq 100$.

* * * * *